United States Patent
Sutherland et al.

(10) Patent No.: US 7,832,370 B2
(45) Date of Patent: Nov. 16, 2010

(54) LOW-LOAD OPERATION EXTENSION OF A HOMOGENEOUS CHARGE COMPRESSION IGNITION ENGINE

(75) Inventors: Don R. Sutherland, Romeo, MI (US); Tang-Wei Kuo, Troy, MI (US); Barry L. Brown, Lake Orion, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 598 days.

(21) Appl. No.: 11/934,286

(22) Filed: Nov. 2, 2007

(65) Prior Publication Data

US 2008/0283006 A1    Nov. 20, 2008

Related U.S. Application Data

(60) Provisional application No. 60/866,074, filed on Nov. 16, 2006.

(51) Int. Cl.
*F02D 13/02*    (2006.01)
*F01L 1/34*    (2006.01)

(52) U.S. Cl. .................................. 123/143 A; 123/299

(58) Field of Classification Search ............. 123/143 A, 123/299, 304, 300, 305, 90.15, 90.17
See application file for complete search history.

(56) References Cited

U.S. PATENT DOCUMENTS

| | | |
|---|---|---|
| 3,714,932 A | 2/1973 | Meacham et al. |
| 4,350,129 A | 9/1982 | Nakajima et al. |
| 4,446,830 A | 5/1984 | Simko et al. |
| 4,703,734 A | 11/1987 | Aoyama et al. |
| 5,331,933 A | 7/1994 | Matsushita |
| 5,404,844 A | 4/1995 | Schechter et al. |
| 5,590,626 A | 1/1997 | Hitomi et al. |
| 5,622,144 A | 4/1997 | Nakamura et al. |
| 5,623,904 A | 4/1997 | Matsumoto |
| 5,713,328 A | 2/1998 | Anderson et al. |
| 5,740,775 A | 4/1998 | Suzuki et al. |
| 5,746,182 A | 5/1998 | Nada |
| 6,062,189 A | 5/2000 | Kaneko et al. |
| 6,082,342 A | 7/2000 | Duret et al. |
| 6,155,217 A | 12/2000 | Shiraishi et al. |
| 6,178,956 B1 | 1/2001 | Steinmann et al. |
| 6,182,632 B1 | 2/2001 | Yanagihara |
| 6,267,097 B1 | 7/2001 | Urushihara et al. |
| 6,276,334 B1 | 8/2001 | Flynn et al. |
| 6,286,478 B1 | 9/2001 | Atago et al. |
| 6,311,653 B1 | 11/2001 | Hamamoto |
| 6,336,436 B1 | 1/2002 | Miyakubo et al. |
| 6,340,014 B1 | 1/2002 | Tomita et al. |
| 6,343,585 B1 | 2/2002 | Fujieda et al. |

(Continued)

FOREIGN PATENT DOCUMENTS

JP    2000320333 A    11/2000

(Continued)

*Primary Examiner*—Hieu T Vo

(57) ABSTRACT

A method for extending the low-load operation of a homogeneous charge compression ignition engine includes employing a valve actuation device creating a negative valve overlap, thereby trapping and recompressing combusted gases within a combustion chamber, the device effecting increasingly longer negative valve overlap as engine load decreases, injecting during the negative valve overlap a fraction of fuel into the recompressed combusted gases, and igniting the fuel with a heat source during the negative valve overlap.

20 Claims, 4 Drawing Sheets

U.S. PATENT DOCUMENTS

| | | |
|---|---|---|
| 6,374,813 B1 | 4/2002 | Iida et al. |
| 6,386,177 B2 | 5/2002 | Urushihara et al. |
| 6,401,688 B2 | 6/2002 | Teraji et al. |
| 6,425,367 B1 | 7/2002 | Hiraya et al. |
| 6,442,200 B1 | 8/2002 | Fukui |
| 6,467,451 B1 | 10/2002 | Volz et al. |
| 6,505,601 B1 | 1/2003 | Jorach et al. |
| 6,508,229 B2 | 1/2003 | Miyakubo et al. |
| 6,530,351 B2 | 3/2003 | Mikame |
| 6,564,758 B1 | 5/2003 | Enderle et al. |
| 6,612,294 B2 | 9/2003 | Hiraya et al. |
| 6,626,164 B2 | 9/2003 | Hitomi et al. |
| 6,640,771 B2 | 11/2003 | Fuerhapter |
| 6,651,601 B2 | 11/2003 | Sun et al. |
| 6,659,071 B2 | 12/2003 | LaPointe et al. |
| 6,708,680 B2 | 3/2004 | Lavy et al. |
| 6,718,957 B2 | 4/2004 | Kakuho et al. |
| 6,752,123 B2 | 6/2004 | Unger et al. |
| 6,817,349 B2 | 11/2004 | Awasaka et al. |
| 6,910,449 B2 | 6/2005 | Strom et al. |
| 6,971,365 B1 | 12/2005 | Najt et al. |
| 7,004,124 B2 | 2/2006 | Kuo et al. |
| 7,059,281 B2 | 6/2006 | Kuo et al. |
| 7,681,550 B2 * | 3/2010 | Kobayashi .................. 123/299 |
| 7,703,434 B2 * | 4/2010 | Sloane et al. ............... 123/299 |
| 2001/0017114 A1 | 8/2001 | Mikame |
| 2001/0022168 A1 | 9/2001 | Teraji et al. |
| 2001/0045200 A1 | 11/2001 | Urushihara et al. |
| 2002/0046741 A1 | 4/2002 | Kakuho et al. |
| 2003/0140877 A1 | 7/2003 | Kramer |
| 2004/0112307 A1 | 6/2004 | Allen |
| 2004/0134449 A1 | 7/2004 | Yang |
| 2004/0159093 A1 | 8/2004 | Pott et al. |
| 2005/0000478 A1 | 1/2005 | Kuo et al. |
| 2005/0000485 A1 | 1/2005 | Kuo et al. |
| 2006/0016423 A1 | 1/2006 | Kuo et al. |

FOREIGN PATENT DOCUMENTS

| | | |
|---|---|---|
| JP | 2002227680 A | 8/2002 |
| JP | 2006144714 A | 6/2006 |
| JP | 20088-286159 A * | 11/2008 |
| JP | 2009-180197 A * | 8/2009 |
| WO | WO 00/28198 A1 | 5/2000 |
| WO | WO 01/46571 A1 | 6/2001 |
| WO | WO 01/46573 A1 | 6/2001 |

* cited by examiner

LOW-LOAD OPERATION EXTENSION OF A HOMOGENEOUS CHARGE COMPRESSION IGNITION ENGINE

CROSS REFERENCE TO RELATED APPLICATIONS

This application claims the benefit of U.S. Provisional Application No. 60/866,074 filed on Nov. 16, 2006 which is hereby incorporated herein by reference.

TECHNICAL FIELD

This disclosure pertains to internal combustion engine control systems.

BACKGROUND

One engine system being developed for controlled auto-ignition combustion operation comprises an internal combustion engine designed to operate under an Otto cycle. The engine, equipped with direct in-cylinder fuel-injection, operates in a controlled auto-ignition mode under specific engine operating conditions to achieve improved engine fuel efficiency. A spark ignition system is employed to supplement the auto-ignition combustion process during specific operating conditions. Such engines are referred to as Homogeneous Charge Compression Ignition (hereinafter 'HCCI') engines.

An HCCI engine operating in HCCI combustion mode creates a charge mixture of combusted gases, air, and fuel in a combustion chamber, and auto-ignition is initiated simultaneously from many ignition sites within the charge mixture during a compression stroke, resulting in stable power output, high thermal efficiency and low emissions. The combustion is highly diluted and uniformly distributed throughout the charge mixture, resulting in low burnt gas temperature and NOx emissions typically substantially lower than NOx emissions of either a traditional spark ignition engine, or a traditional diesel engine.

HCCI has been demonstrated in two-stroke gasoline engines using conventional compression ratios. It is believed that the high proportion of burnt gases remaining from the previous cycle, i.e., the residual content, within the two-stroke engine combustion chamber is responsible for providing the high mixture temperature necessary to promote auto-ignition in a highly diluted mixture.

In four-stroke engines with traditional valve means, the residual content is low and HCCI at part load is difficult to achieve. Known methods to induce HCCI at low and part loads include: 1) intake air heating, 2) variable compression ratio, and 3) blending gasoline with ignition promoters to create a more easily ignitable mixture than gasoline. In all the above methods, the range of engine speeds and loads in which HCCI can be achieved is relatively narrow. Extended range HCCI has been demonstrated in four-stroke gasoline engines using variable valve actuation with certain valve control strategies that effect a high proportion of residual combustion products from previous combustion cycle necessary for HCCI in a highly diluted mixture. With such valve strategies, the range of engine speeds and loads in which HCCI can be achieved is greatly expanded using a conventional compression ratio. One such valve strategy includes trapping and recompression of exhaust gases by early closure of the exhaust valve during the exhaust stroke. Such valve control can be implemented using variable cam phasers; however, cam phaser authority does have adjustment limits.

However, even within the limits of cam phaser authority, in such valve control strategies, low load HCCI engine operation is limited by the combustion chamber temperature achievable. Some extension of low load operation by introducing a first fraction of fuel late during an exhaust stroke of the piston into a combustion chamber including recompressed exhaust gases has been achieved. Such fuel fraction undergoes partial oxidation or reforming reaction to produce additional heat and conditions conducive to auto-ignition of a second fraction of fuel supplied during the compression stroke. However, the amount of fuel that can be reformed in such a manner is limited by recompression temperature and pressure, and oxygen availability. Hence, ultimately, low load HCCI engine operation remains limited by the inability of such techniques to achieve the temperatures necessary for controlled auto-ignition.

Further extension of the low load operating limit has been demonstrated by applying spark assist to the second fraction of fuel injected during the compression stroke. A stratified-ignition assisted, controlled auto-ignition combustion process is realized.

SUMMARY

A method for extending the low-load operation of a four-stroke internal combustion homogeneous charge compression ignition engine includes employing a valve actuation device to control the intake valve and the exhaust valve creating a negative valve overlap, thereby trapping and recompressing combusted gases within the combustion chamber. Shorter negative valve overlaps for operation closer to a mid-load operation of the engine and increasingly longer negative valve overlaps as engine load decreases are employed. A fraction of fuel is injected into the recompressed combusted gases, which fraction is a portion of the total amount of fuel injected into the combustion chamber for a combustion cycle. At least a portion of the fuel is ignited with a heat source during the negative valve overlap.

BRIEF DESCRIPTION OF THE DRAWINGS

One or more embodiments will now be described, by way of example, with reference to the accompanying drawings, in which.

DETAILED DESCRIPTION

Figure 1:
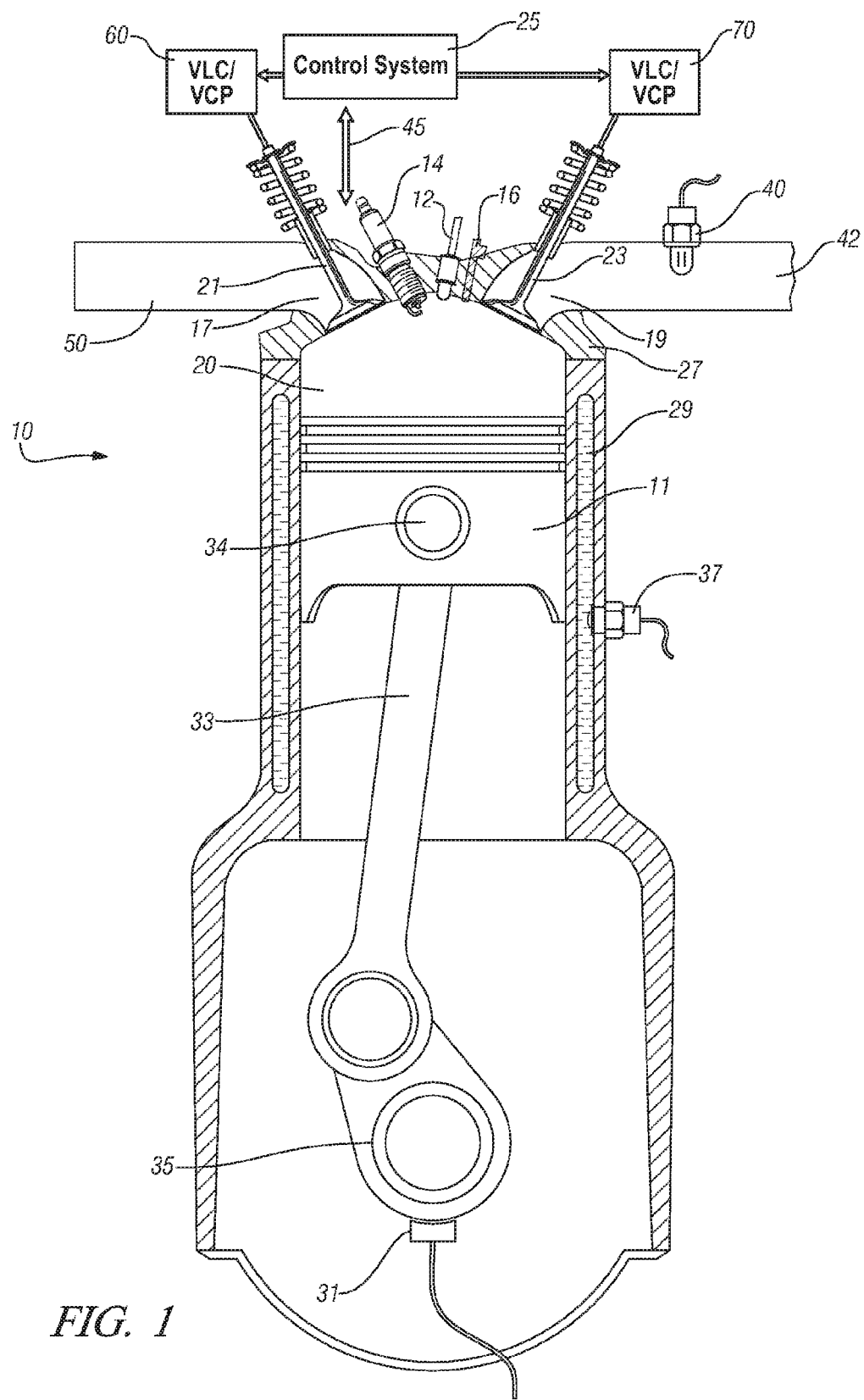
FIG. 1 is a schematic illustration of an exemplary internal combustion engine adapted for HCCI and SI operating modes in accordance with the present disclosure.

Referring now to the drawings, wherein the showings are for the purpose of illustrating certain exemplary embodiments only and not for the purpose of limiting the same, FIG. 1 shows a schematic of an internal combustion engine 10 and control system 25 which has been constructed in accordance with one embodiment of the present disclosure. The embodiment as shown is applied as part of an overall control scheme to operate an exemplary multi-cylinder, spark ignition, direct-injection, gasoline, four-stroke internal combustion engine adapted to operate under a controlled auto-ignition process, also referred to as homogenous-charge, compression-ignition ('HCCI') mode.

The exemplary engine 10 comprises: a cast-metal engine block with a plurality of cylinders formed therein, one of which is shown, and an engine head 27. Each cylinder comprises a closed-end cylinder having a moveable, reciprocating piston 11 inserted therein. A variable volume combustion chamber 20 is formed in each cylinder, and is defined by walls of the cylinder, the moveable piston 11, and the head 27. The engine block preferably includes coolant passages 29 through which engine coolant fluid passes. A coolant temperature sensor 37, operable to monitor temperature of the coolant fluid, is located at an appropriate location, and provides a parametric signal input to the control system 25 useable to control the engine. The engine preferably includes known systems including an external exhaust gas recirculation ('EGR') valve and an intake air throttle valve (not shown).

Each moveable piston 11 comprises a device designed in accordance with known piston forming methods, and includes a top and a body which conforms substantially to the cylinder in which it operates. The piston has top or crown area that is exposed in the combustion chamber. Each piston is connected via a pin 34 and connecting rod 33 to a crankshaft 35. The crankshaft 35 is rotatably attached to the engine block at a main bearing area near a bottom portion of the engine block, such that the crankshaft is able to rotate around an axis that is perpendicular to a longitudinal axis defined by each cylinder. A crank sensor 31 is placed in an appropriate location, operable to generate a signal that is useable by the controller 25 to measure crank angle, and which is translatable to provide measures of crankshaft rotation, speed, and acceleration that are useable in various control schemes. During operation of the engine, each piston 11 moves up and down in the cylinder in a reciprocating fashion due to connection to and rotation of the crankshaft 35, and the combustion process. The rotation action of the crankshaft effects translation of linear force exerted on each piston during combustion to an angular torque output from the crankshaft, which can be transmitted to another device, e.g. a vehicle driveline.

The engine head 27 comprises a cast-metal device having one or more intake ports 17 and one or more exhaust ports 19 which flow to the combustion chamber 20. The intake port 17 supplies air to the combustion chamber 20. Combusted (burned) gases flow from the combustion chamber 20 via exhaust port 19. Flow of air through each intake port is controlled by actuation of one or more intake valves 21. Flow of combusted gases through each exhaust port is controlled by actuation of one or more exhaust valves 23.

The intake and exhaust valves 21, 23 each have a head portion that includes a top portion that is exposed to the combustion chamber. Each of the valves 21, 23 has a stem that is connected to a valve actuation device. An exemplary valve actuation device, depicted as 60, is operative to control opening and closing of each of the intake valves 21, and a second exemplary valve actuation device 70 operative to control opening and closing of each of the exhaust valves 23. Each of the valve actuation devices 60 and 70 comprises a device signally connected to the control system 25 and operative to control timing, duration, and magnitude of opening and closing of each valve, either in concert or individually. The first embodiment of the exemplary engine comprises a dual overhead cam system which has variable lift control ('VLC') and variable cam phasing ('VCP') controlled by the valve actuation devices 60 and 70. The exemplary valve activation device comprising a VCP device is operative to control timing of opening or closing of each intake valve and each exhaust valve relative to rotational position of the crankshaft and opens each valve for a crank angle duration. The exemplary valve activation device comprising a VLC device is operative to control valve lift, or opening, to one of two distinct steps, e.g., a low-lift valve opening (about 3-6 mm) for low speed, low load operation, and a high-lift valve opening (about 8-10 mm) for high speed and high load operation. As known to those having ordinary skill in the art, VCP/VLC devices have a limited range of authority over which opening and closings of the intake and exhaust valves can be controlled. The typical VCP device has a range of phasing authority of 30°-90° of cam shaft rotation, thus permitting the control system to advance or retard opening and closing of the engine valves. The range of phasing authority is defined and limited by the hardware of the VCP and the control system which actuates the VCP. Individual valve actuation devices can serve the same function to the same effect. The valve actuation devices are preferably controlled by the control system 25 according to predetermined control schemes. Alternative variable valve actuation devices including, for example, fully flexible electrical or electro-hydraulic devices may also be used and have the further benefit of continuously variable, independent opening and closing phase control as well as substantially infinite valve lift variability within the limits of the system. A specific aspect of a control scheme to control opening and closing of the valves is described herein. The particular arrangement of valve activation devices may vary widely from application to application and is not intended to be limited to the particular embodiments discussed herein.

Air is inlet to the intake port 17 through an intake manifold runner 50, which receives filtered air passing through a known air metering device and a throttle device (not shown). Exhaust gas passes from the exhaust port 19 to an exhaust manifold 42, which includes exhaust gas sensors 40 operative to monitor constituents of the exhaust gas feedstream, and determine parameters associated therewith. The exhaust gas sensors 40 can comprise any of several known sensing devices operative to provide parametric values for the exhaust gas feedstream, including air/fuel ratio, or measurement of exhaust gas constituents, e.g. NOx, CO, HC, and others. The system may include an in-cylinder sensor 16 for monitoring combustion pressures, or non-intrusive pressure sensors or inferentially determined pressure determination (e.g. through crankshaft accelerations). The aforementioned sensors and metering devices each provide a signal as a parametric input to the control system 25. These parametric inputs can be used by the control system to determine combustion performance measurements.

The control system 25 preferably comprises a subset of an overall control architecture operable to provide coordinated system control of the engine 10 and other systems. In overall operation, the control system 25 is operable to synthesize operator inputs, ambient conditions, engine operating parameters, and combustion performance measurements, and execute algorithms to control various actuators to achieve targets for control parameters, including such parameters as fuel economy, emissions, performance, and driveability. The control system 25 is operably connected to a plurality of devices through which an operator typically controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network ('LAN') bus (not shown) which preferably allows for structured communication of control parameters and commands between various controllers.

Actuators controlled by the control system 25 include: fuel injectors 12; the VCP/VLC valve actuation devices 60, 70; spark plug 14 operably connected to ignition modules for controlling spark dwell and timing; exhaust gas recirculation (EGR) valve (not shown), and, electronic throttle control module (not shown). Fuel injector 12 is preferably operable to inject fuel directly into each combustion chamber 20. Specific details of exemplary direct injection fuel injectors are known and not detailed herein. Spark plug 14 is employed by the control system 25 to enhance ignition timing control of the exemplary engine across portions of the engine speed and load operating range. When the exemplary engine is operated in a purely HCCI mode, the engine does not utilize an energized spark plug. However, it has proven desirable to employ spark ignition to complement the HCCI mode under certain conditions, including, e.g. during cold start, to prevent fouling and, in accordance with certain aspects of the present disclosure at low load operating conditions near a low-load limit. Also, it has proven preferable to employ spark ignition at a high load operation limit in the HCCI mode, and at high speed/load operating conditions under throttled or un-throttled spark-ignition operation.

The control system 25 is operably connected to the engine 10, and functions to acquire parametric data from sensors, and control a variety of actuators of the engine 10 over appropriate interfaces 45. The control system 25 executes algorithmic code stored therein to control the aforementioned actuators to specific control states to control the engine operation, including: throttle position (ETC); spark timing and dwell (IGN); fuel injection mass and timing (Inj_pw); phasing, lift and duration of openings of the intake and/or exhaust valves (VCP/VLC); and, EGR valve position (EGR) to control flow of recirculated exhaust gases. The phasing, lift and duration of openings of the intake and/or exhaust valves includes negative valve overlap and lift of exhaust valve reopening (in an exhaust re-breathing strategy). The control module is adapted to monitor input signals from the operator (e.g., an accelerator pedal position and a brake pedal position) to determine the operator torque request (To_req), and adapted to monitor engine operating states from sensors, including those indicating engine speed (RPM), engine load (using MAF, MAP, or Inj_pw), coolant temperature (coolant), intake air temperature (Tin), and other ambient conditions, to determine an engine operating point, primarily related to engine speed and load.

The control system 25 preferably comprises a general-purpose digital computer generally comprising a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer.

Algorithms for engine control are typically executed during preset loop cycles such that each algorithm is executed at least once each loop cycle. Algorithms stored in the non-volatile memory devices are executed by the central processing unit and are operable to monitor inputs from the sensing devices and execute control and diagnostic routines to control operation of the engine, using preset calibrations. Loop cycles are typically executed at regular intervals, for example each 3.125, 6.25, 12.5, 25 and 100 milliseconds during ongoing engine operation. Alternatively, algorithms may be executed in response to occurrence of an event or interrupt request.

Figure 2A:
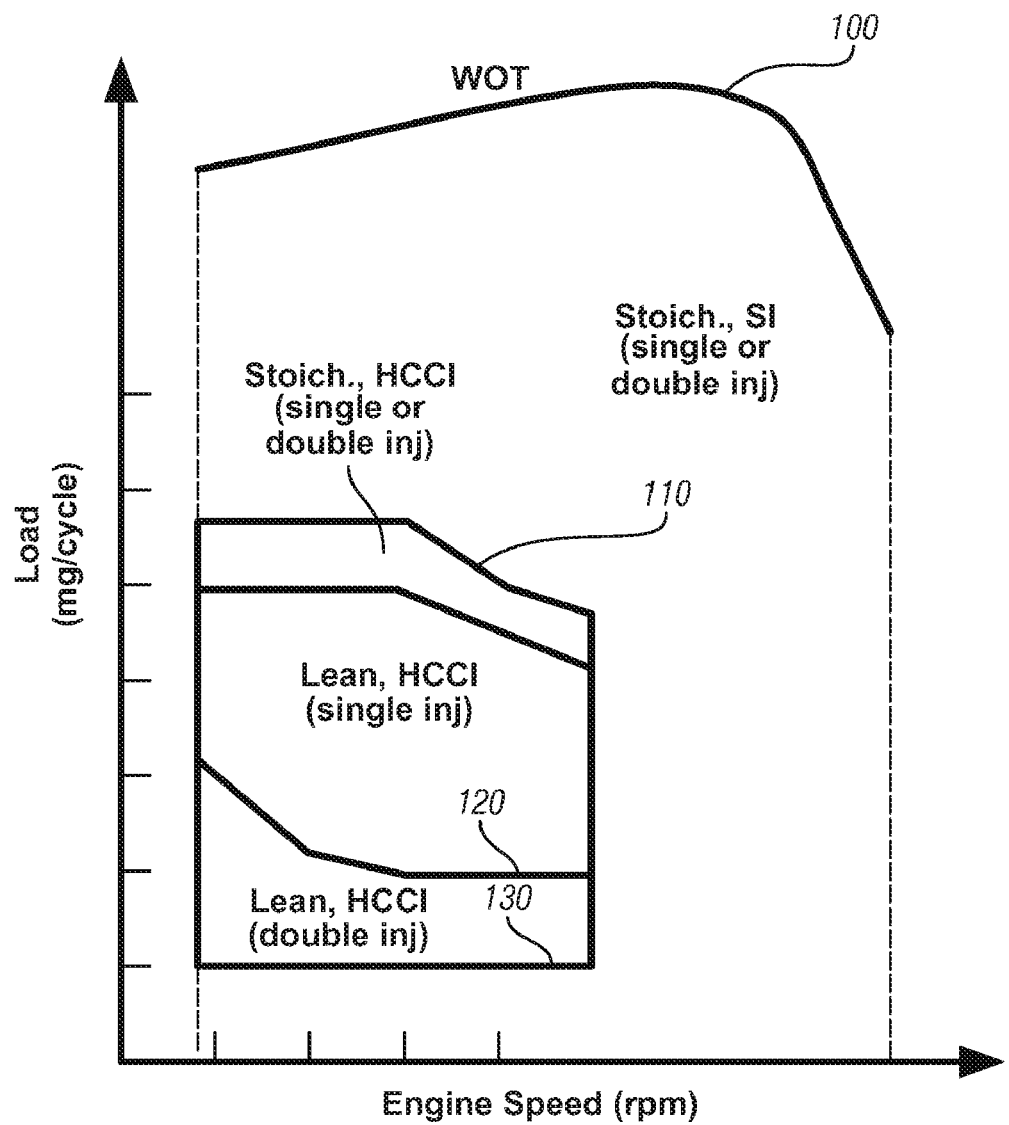
FIG. 2A is an illustration of operating regions of a known engine including HCCI modes of operation in accordance with the present disclosure.

Referring now to FIG. 2A, an exemplary mapping of combustion modes under various engine speed versus load conditions for the exemplary dual overhead cam engine with variable valve actuation system having dual cam phasers and 2-step lifter system. The exemplary engine is operative in HCCI mode, over a range of engine speeds ('RPM') and loads as represented by fuel mass ('mg/cycle'). Line 110 depicts an upper limit for operating the engine in HCCI modes. Below line 110 are various sub-regions of HCCI operation including stoichiometric and lean HCCI modes. Lean HCCI modes are further subdivided (line 120) in accordance with fueling strategies which generally establish single injections at high part loads and split or double injections below high part loads. Line 130 depicts a lower limit for operating the engine in a purely HCCI mode without external ignition source. Known strategies for operating engines in the zone below line 130 include stoichiometric standard ignition mode and hybrid HCCI modes with spark assistance near the transition between the compression and expansion strokes of the piston. However, it will be appreciated that spark assisted HCCI modes lose many of the benefits attained by purely HCCI operation.

The lowest load attainable in HCCI mode without spark assistance is limited primarily by the combustion chamber temperature achievable through a combination of the heat of the residual combusted gases, the heat of compression of such gases and any heat release from reformation or partial oxidation of fuel injected during recompression of residual combusted gases. HCCI operation can only take place when the compressed fuel air mixture in the compression stroke reaches a temperature necessary to start auto-ignition in the fuel air mixture.

Figure 3A:
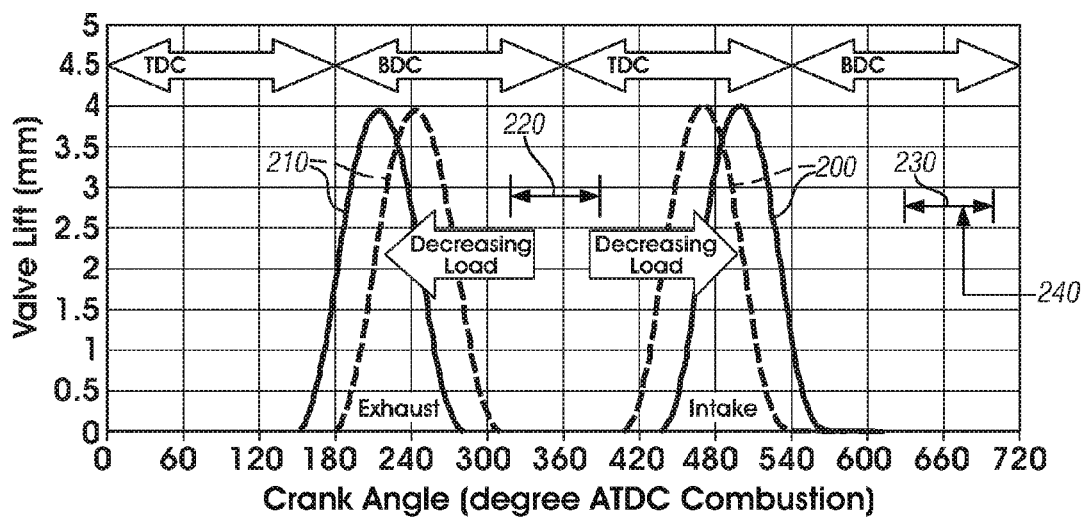
FIG. 3A is an exemplary illustration of known methods including negative valve overlap, fueling and ignition in accordance with the present disclosure.

One known method for maintaining heat necessary for HCCI operation in the combustion chamber at low-load is described in FIG. 3A in which valve lift, a measure of the open state of the valve, is measured against crank angle. Exhaust valve position is described by line 210 and intake valve position is described by line 200. The gap in the center of the FIG. 3A between lines 210 and 200 represents the negative valve overlap, where both valves are closed and the piston drives up from some portion of the exhaust stroke, through top dead center, and then descends into the intake stroke. Because this fixed mass of hot combusted gas left over from the last combustion cycle is trapped and compressed to the top dead center piston position, the gas temperature goes up further. A method known as double injection utilizes this trapped, heated, combusted gas, injects fuel into the combusted gas during some time span 220 during the negative valve overlap, and utilizes the high temperature in the combusted gas to cause a partial combustion or reformation reaction in the fuel during the negative valve overlap. This reaction in the double injection method increases the heat in the combustion chamber, and this heat is carried through the remainder of the combustion cycle. As mentioned above, the lower limit of HCCI operation is determined by the minimum heat that must be present in the combustion chamber as a second injection is introduced to the combustion chamber in the compression stroke, depicted in FIG. 3A by time span 230, that can enable the resulting fuel air mixture to reach a minimum auto-ignition temperature at some point 240. By reforming fuel in the combusted gas during the negative valve overlap, the known method of double injection adds heat to the combustion chamber, thereby expanding the lower limit of HCCI operation. However, known methods of double injection have their limits, for example, at increasingly low loads, the compression of combusted gases in the negative valve overlap may not achieve temperatures in the combusted gas high enough to sustain the partial combustion or reformation processes. This limitation may be lessened by modulation of phases associated with the negative valve overlap. Such a method of adjusting valve phases is represented by the dotted and solid lines 210 and 200 in FIG. 3A. The dotted lines show valve operation at some load higher than the HCCI lower limit represented in FIG. 2A above line 130. The solid lines 210, 200 show valve operation at a decreased engine load from the load represented by the dotted line but still above the engine load represented by line 130. By expanding the negative valve overlap, the exhaust valve closes earlier in the exhaust stroke, thereby trapping more combusted gas. The greater mass of combusted gas trapped by the earlier closing of the exhaust valve is still compressed down to the same volume within the combustion chamber with the piston at top dead center. Greater compression creates higher temperatures in the combustion chamber, allowing the partial combustion or reformation of fuel at increasingly lower engine loads. However, modulation of valve phases can only increase the low load range of HCCI operation so far. At some low load, the compression of combusted gas in the negative valve overlap fails to reach temperatures required to achieve partial combustion, and the heat realized through double injection ceases to be added to the combustion chamber. This low load point where double injection ceases to aid HCCI operation is denoted by line 130 on FIG. 2A. Without the heat added by double injection, the fuel air mixture in the compression stroke fails to reach temperatures required for a homogeneous charge to spontaneously combust and the engine can no longer operate in HCCI mode. It can be appreciated that methods increasing extending the low load limit for operating the engine in an overall lean mode would provide many of the benefits of HCCI combustion (e.g. fuel economy) over a larger operating region of the engine.

Figure 3B:
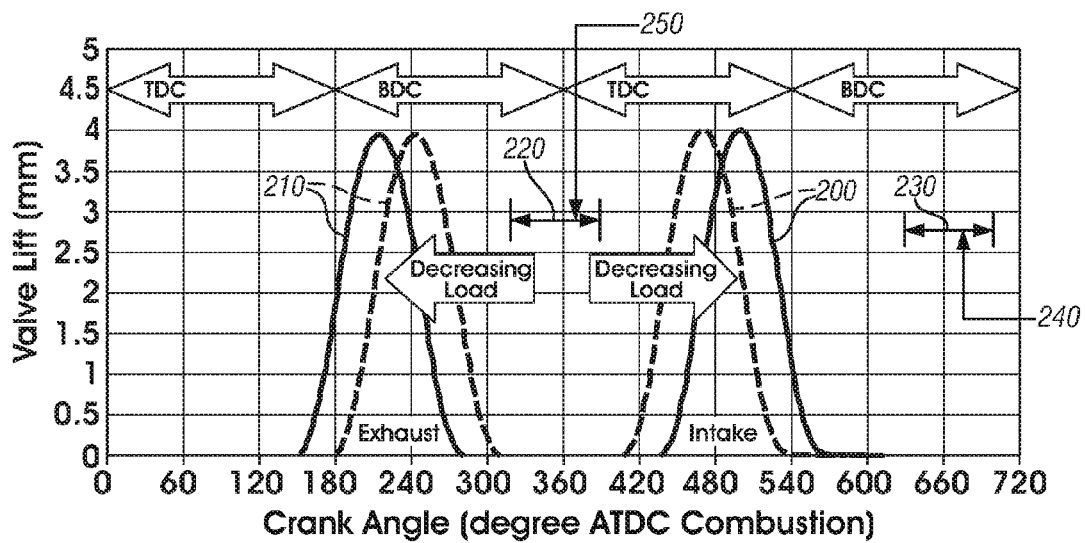
FIG. 3B is an exemplary illustration of negative valve overlap, fueling and ignition in accordance with the present disclosure.

Therefore, with reference to FIG. 3B and in accordance with the present disclosure, extension of the low load HCCI limit is effected by utilizing the double injection method with the addition of an external heat source to the combusted gas and fuel mixture. Fuel is injected into the combustion chamber during time span 220 according to the double injection method and is ignited at point 250 through application of an external heat source. Preferably, the heat source is a spark plug and the fuel injector and spark plug are arranged in such a manner to effect a stratified, spray-guided combustion. Alternatively, wall-guided combustion techniques may be employed. However, owing to the relatively late injection relative to the piston recompression top dead center and the need for specialized piston bowl geometries, wall-guide techniques may not be as desirable. Alternative external heat sources may also be employed and include, for example, glow plugs and hot spots within the combustion chamber. Hot spots may take the form of localized areas of high temperature identified through testing or areas made hot by design, for example, by routing cooling lines slightly away from an area to create elevated temperatures on a particular portion of a cylinder wall. Therefore, it can be appreciated that the fuel injected during the negative valve overlap undergoes at least a partial combustion initiated by the external heat source and not merely reformation due to the heat of the recompressed residual exhaust gases and the external heat source. Significant additional heat is thereby released within the combustion chamber to effect conditions conducive to auto-ignition at point 240 of a second fraction of fuel injected during time span 230 during the compression stroke which may be accomplished with or without a spark assist.

Additionally, addition of the heat source to the fuel present during negative valve overlap reduces the need to utilize aggressive valve phasing. Because the heat source is present to insure that fuel injected into the combusted gas will be partially combusted, conditions in the combusted gas necessary to reach partial combustion are therefore achievable at smaller negative valve overlaps for a given engine load.

Figure 2B:
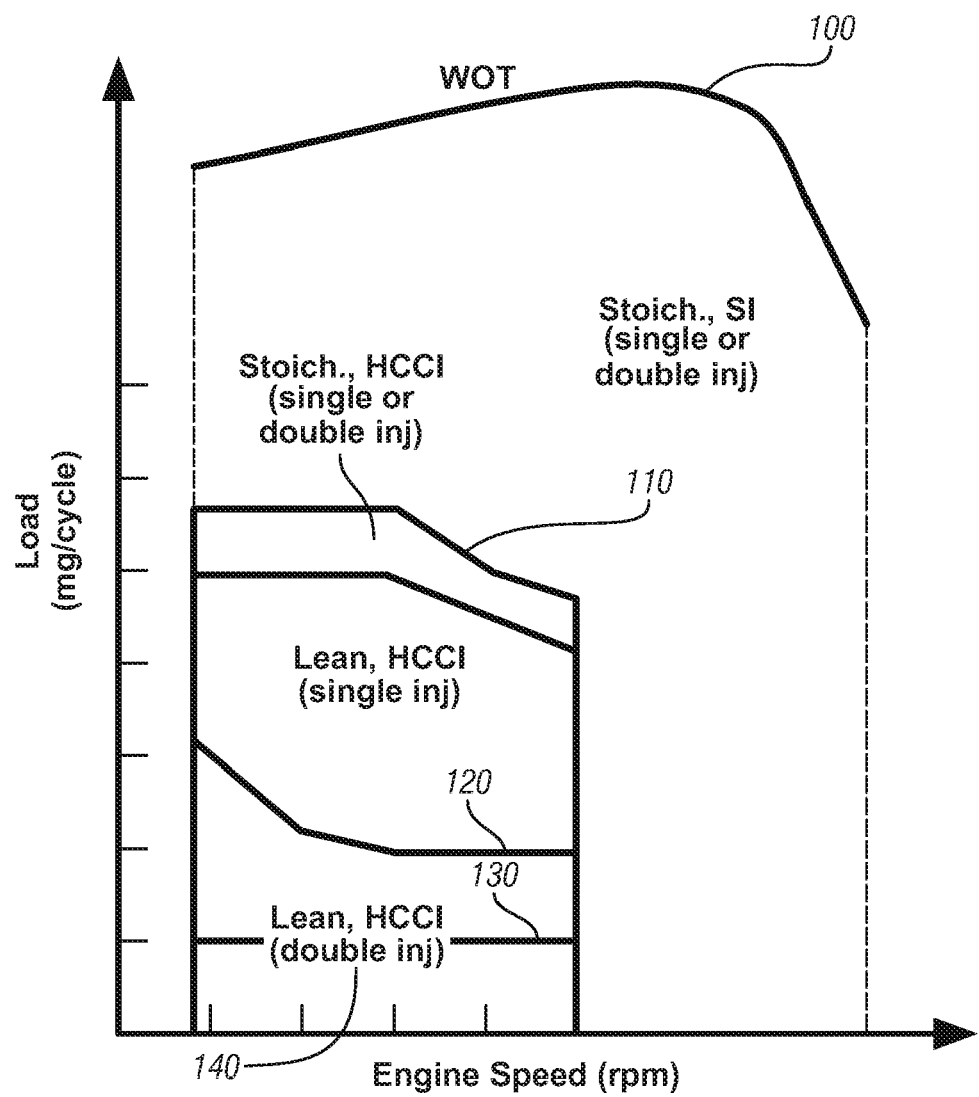
FIG. 2B is an illustration of operating regions of an exemplary engine including HCCI modes of operation in accordance with the present disclosure.

The benefits of the above disclosed methods are illustrated in FIG. 2B. Line 130 represents the line at which fuel injected into the combusted gas during known methods of double injection cease to add the heat required to maintain HCCI operation. By adding a heat source to the fuel present during the negative valve overlap, the addition of heat to the combustion chamber as a result of double injection is no longer dependent on maintaining a particular engine load to maintain reformation of the fuel within the combusted gas. Therefore, HCCI operation enabled by the heat added during double injection may be accomplished at engine loads below line 130, represented by area 140. In this way, the benefits of lean HCCI mode operation may be extended to low loads not capable of sustaining known methods of double injection.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus for operating an internal combustion engine in low-load homogeneous charge compression ignition operation, comprising:
    a variable volume combustion chamber defined by a piston reciprocating within a cylinder between top-dead center and bottom-dead center points;
    an intake valve and an exhaust valve,
    a valve actuation device for varying phasing of said intake and exhaust valves, wherein said intake and exhaust valves are controlled by said valve activation device during repetitive, sequential exhaust, intake, compression and expansion strokes of said piston, said exhaust valve closing prior to said intake valve opening to create a negative valve overlap, said negative valve overlap being shorter for higher low-load operation and longer for lower low-load operation;
    a fuel injector injecting fuel into said combustion chamber during said negative valve overlap; and
    a heat source positioned to ignite said fuel during said negative valve overlap.

2. The apparatus of claim 1, wherein said heat source is a spark plug.

3. The apparatus of claim 1, wherein said heat source is a glow plug.

4. The apparatus of claim 1, wherein said heat source is a hot spot within said combustion chamber.

5. The apparatus of claim 4, wherein said hot spot is a portion of said combustion chamber identified through testing to consistently exhibit high temperatures during low-load operation.

6. The apparatus of claim 4, wherein said hot spot is a portion of said combustion chamber created to be distant from cooling features within said combustion chamber, such that said portion exhibits high temperatures during low-load operation.

7. The apparatus of claim 1, wherein said valve actuation device adjusts phase of at least one of said intake valve and said exhaust valve through a plurality of phases in order to adjust said negative valve overlap.

8. The apparatus of claim 1, wherein said valve actuation device adjusts phase control of at least one of said intake valve and said exhaust valve through a continuous range of phases in order to adjust said negative valve overlap.

9. The apparatus of claim 1, wherein said valve actuation device utilizes mechanical actuation to adjust phase of at least one of said intake valve and said exhaust valve.

10. The apparatus of claim 1, wherein said valve actuation device utilizes electrical actuation to adjust phase control of at least one of said intake valve and said exhaust valve.

11. The apparatus of claim 1, wherein said valve actuation device utilizes electro-hydraulic actuation to adjust phase control of at least one of said intake valve and said exhaust valve.

12. A method for extending the low-load operation of a four-stroke internal combustion homogeneous charge compression ignition engine including a variable volume combustion chamber defined by a piston reciprocating within a cylinder between top-dead center and bottom-dead center points, intake and exhaust passages, and intake and exhaust valves controlled during repetitive, sequential exhaust, intake, compression and expansion strokes of said piston comprising:

employing a valve actuation device to control said intake valve and said exhaust valve creating a negative valve overlap, thereby trapping and recompressing combusted gases within said combustion chamber, said employing effecting shorter negative valve overlap for operation closer to a mid-load operation of said engine and effecting increasingly longer negative valve overlap as engine load decreases;

injecting during said negative valve overlap a fraction of fuel into said recompressed combusted gases which is a portion of said total amount of fuel injected into said combustion chamber for a combustion cycle; and igniting at least a portion of said fraction of fuel with a heat source during said negative valve overlap.

13. The method of claim 12, wherein said employing comprises adjusting phase of said exhaust valve.

14. The method of claim 12, wherein said employing comprises adjusting phase of said intake valve.

15. The method of claim 12, wherein said employing comprises adjusting phase of said exhaust valve and said intake valve.

16. The method of claim 15, wherein said adjusting phase of said exhaust valve and said intake valve is performed as a coordinated change, wherein any change in the phase of one valve is matched by a substantially equal and opposite change in the phase of the other valve.

17. The method of claim 12, wherein said injecting and igniting establishes a stratified, spray guided combustion.

18. The method of claim 12, wherein said igniting is effected with a spark plug.

19. The method of claim 12, wherein said igniting is effected with a glow plug.

20. The method of claim 12, wherein said igniting is effected with a hot spot within said combustion chamber.

* * * * *